United States Patent [19]

Hori et al.

[11] Patent Number: 5,072,209
[45] Date of Patent: Dec. 10, 1991

[54] DATA DISPLAY SYSTEM FOR VEHICLES

[75] Inventors: Toshio Hori, Gifu; Kenji Furuhashi, Nagoya; Makoto Wakita, Gifu; Kazuo Ueda, Kagamigahara, all of Japan

[73] Assignee: Kawajyuu Gifu Engineering Co., Ltd., Kagamigahara, Japan

[21] Appl. No.: 468,129

[22] Filed: Jan. 22, 1990

[30] Foreign Application Priority Data

Apr. 21, 1989 [JP] Japan .................................. 1-102892

[51] Int. Cl.⁵ ............................................... B62J 3/00
[52] U.S. Cl. .................................... 340/432; 340/705; 340/980
[58] Field of Search ............... 340/432, 980, 705, 447, 340/485, 425.5, 438, 439; 362/80.1, 83.1; 350/174; 358/103

[56] References Cited

U.S. PATENT DOCUMENTS

| | | | |
|---|---|---|---|
| 4,449,787 | 5/1984 | Burbo et al. | 340/705 |
| 4,559,516 | 12/1985 | Schott et al. | 340/432 |
| 4,630,904 | 12/1986 | Pastore | 362/83.1 |
| 4,687,072 | 8/1987 | Komuro | 340/705 |
| 4,694,295 | 9/1987 | Miller et al. | 340/435 |
| 4,760,373 | 7/1988 | Reilly | 340/432 |
| 4,878,046 | 10/1989 | Smith | 340/705 |
| 4,891,736 | 1/1990 | Gouda | 362/72 |
| 4,956,752 | 9/1990 | Foglietti | 340/432 |

FOREIGN PATENT DOCUMENTS 3117189 11/1982 Fed. Rep. of Germany ...... 340/432
51-132600 11/1976 Japan.

OTHER PUBLICATIONS

GEC Journal of Science and Technology, vol. 46, No. 1, 1980.
Stephenson et al., "A Helmet-Mounted Sight System", Interavia, Sep. 1979, vol. 34, p. 874.
Boyle "Eye-Ball control".

Primary Examiner—Jin F. Ng
Assistant Examiner—Brent A. Swarthout
Attorney, Agent, or Firm—Fleit, Jacobson, Cohn, Price, Holman & Stern

[57] ABSTRACT

This data display system includes a wireless transmitter mounted on a vehicle. The wireless transmitter is used for transmitting a signal representative of data related to operation of the vehicle. A wireless receiver is mounted on a helmet worn by a driver of the vehicle. The receiver receives a transmitted data signal from the transmitter and generates an output signal. A power supply is mounted on the helmet, and comprises a solar cell and a secondary battery for supplying electric power to the receiver. Converter circuits are connected to an output stage of the wireless receiver for converting the output signal of the receiver into a light display signal of visible rays. A display and mirror are mounted on the helmet for projecting and displaying the display signal from the converter circuits in a forward visual field of the driver.

19 Claims, 8 Drawing Sheets

DATA DISPLAY SYSTEM FOR VEHICLES

BACKGROUND OF THE INVENTION

1. Field of the Invention

The present invention concerns a data display system for optically displaying data related to the operation of a vehicle such as a travel speed, an engine speed and a remaining amount of fuel in the form of a light image at a location where a driver of the vehicle can see it, and more particularly, to a system for displaying the above data in a forward visual field of the driver of the vehicle of the type on which, for example, as in motorcycles, the driver rides while wearing a helmet.

2. Description of the Prior Art

Generally, the data related to the operation of a motorcycle is indicated on the instruments installed in the vicinity of a handlebar of the motorcycle. Due to the configuration of the motorcycle, these instruments cannot be positioned in the forward visual field of the driver. Thus, the driver cannot turn his eyes away from the forward visual field to view these instruments while driving, since it is very dangerous. Accordingly, one may conceive to project optically the above data in the forward visual field of the driver by data projecting means provided on the helmet of the driver.

There also is the same problem in the field of aircraft. In order to resolve this problem, Japanese Patent Public Disclosure No. 51-132600 proposes to install optical data projecting means on a helmet of the aircraft pilot. In the data display system disclosed in the above Japanese Patent Public Disclosure, an optical data source, a prism and a half mirror imaging member are installed on the helmet of the pilot. The optical data source converts information to be displayed into light display signals which then are projected in overlapping relationship with a distant view by means of the prism and the imaging member.

The helmet of the pilot normally includes a communication headphone and a microphone which are connected to the airborne communication equipment through an electrical cord. Similarly, in case of the data display system, a transmitter may be disposed on the aircraft and connected to an optical data source by an electrical cord to transmit signals to it. In case of aircraft, the cord connection described above may not necessarily be an obstacle to the pilot since he does not get on and off frequently, and in principle, does not take off his helmet during flight. Additionally, such a cord can also be used to supply electric power from airborne electric power supplies to the optical data source on the helmet. Thus, the problem for the supply of electric power will not occur. However, in case of vehicles such as motorcycles, the driver gets on and off frequently, and the driver must unadvantageously connect and disconnect the cord of the helmet each time he or she gets on and off the vehicle. Furthermore, if the cord comes off from the helmet when running, it would be impossible for the driver to reconnect the cord while driving the vehicle.

The present invention intends to resolve the problems described above for vehicles such as motorcycles on which the driver rides while wearing a helmet. It is an object of the invention to provide a data display system for optically projecting data related to the operation of the vehicle, in a forward visual field of the driver wearing the helmet which is not necessary to be connected to the vehicle by a cord.

SUMMARY OF THE INVENTION

In order to overcome the problems described above, the present invention provides a data display system in which a wireless transmitter for transmitting a data signal is installed on the vehicle, and a wireless receiver for receiving a transmitted signal from the transmitter, a transducing means for transducing an output signal of the receiver into a light display signal in the form of visible rays and projecting means for projecting the light display signal output of the transducing means are installed on the helmet. A combination of a solar cell and a chargeable secondary battery is also installed on the helmet as an electric power supply for the receiver and the transducing means installed on the helmet.

The present invention also provides a helmet installed with a wireless receiver for receiving a transmitted signal, a transducing means for generating a light display signal in the form of visible ray from an output signal of the receiver, and a projecting means for projecting and displaying the light display signal from the transducing means in a visual field of the user of the helmet.

In the present invention, since the wireless transmitter is installed on the vehicle, and the wireless receiver for receiving a data signal from the transmitter, the transducing means for transducing the output signal of the receiver into the light display signal in the form of visible ray and the projecting means for projecting and displaying the light display signal of the transducing means in the forward visual field are installed on the helmet, data related to the operation of the vehicle can be displayed without the cord connection between the vehicle and the helmet. If a cord is not used between the vehicle and the helmet, it is necessary to supply electric power to the helmet. Thus, in the present invention, a combination of a solar cell and a rechargeable secondary battery is installed on the helmet, so that a lot of time and labor to charge the battery separately may be saved.

DETAILED DESCRIPTION OF THE PREFERRED EMBODIMENTS

General Features

Figure 1:
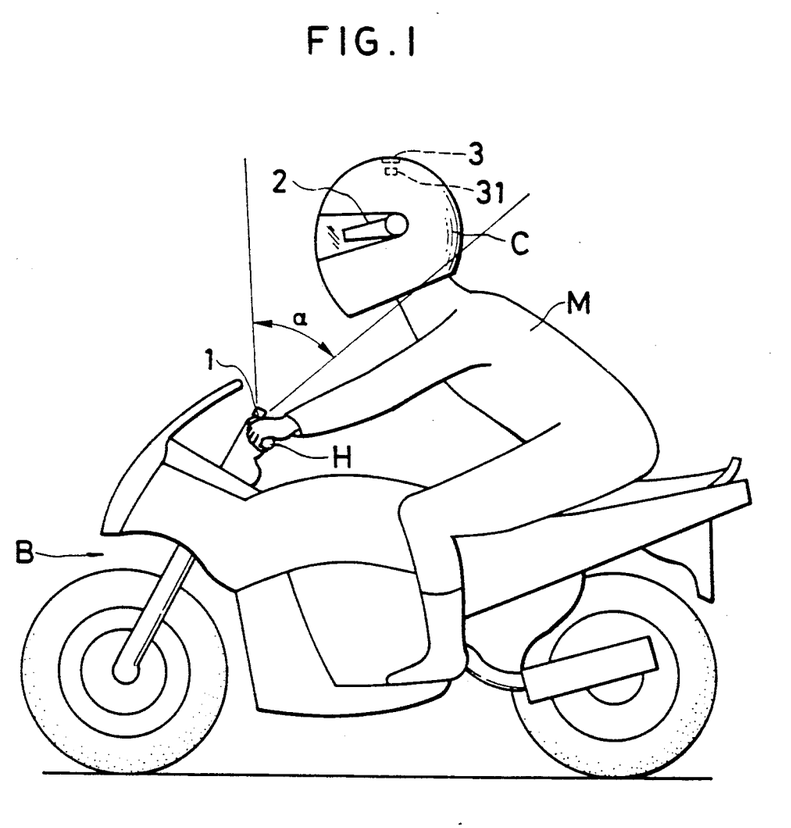
FIG. 1 is a side view of an embodiment of a motorcycle incorporating the present invention.
Figure 2:
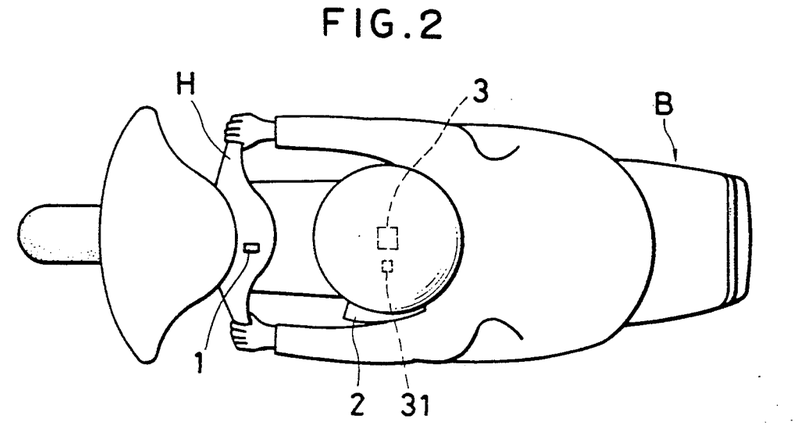
FIG. 2 is a plan view of the embodiment of FIG. 1.

Referring to FIGS. 1 and 2, there is shown an embodiment of a motorcycle incorporating the present invention therein. A body B of the motorcycle includes a handlebar H having a wireless transmitter 1 installed near it's center. A driver M of the motorcycle puts on a helmet C which includes a wireless receiver and display apparatus 2 thereon. The helmet C also includes a solar cell 3 for supplying electric power to the receiver, and display apparatus 2.

In the receiver and display apparatus 2, the information to be displayed includes data related to the operation of the vehicle such as travel speed, remaining amount of fuel, engine speed, and other data such as the time. In the embodiment of the present invention, indication of the travel speed will mainly be described in detail.

The transmitter 1 receives a speed signal in the form of an analog voltage from a speedometer mounted on the vehicle, converts it into a digital signal, and transmits it as a radio signal. Although the radio signal may be in any desired form, it will hereinafter be described as an infrared signal for transmission in the embodiment. As shown in FIG. 1, the transmitter 1 is adapted to transmit an infrared signal only within a cone with a relatively small apex angle $\alpha$ such as 30°. This allows the receiver and display apparatus 2 mounted on the helmet C to be positioned within the transmitting angle of the transmitter 1 for receiving the signal when the driver is in normal driving attitude, and also prevents the receiver and display apparatus 2 from being misactuated in response to the signals transmitted from the transmitters of other motorcycles.

Figure 3:
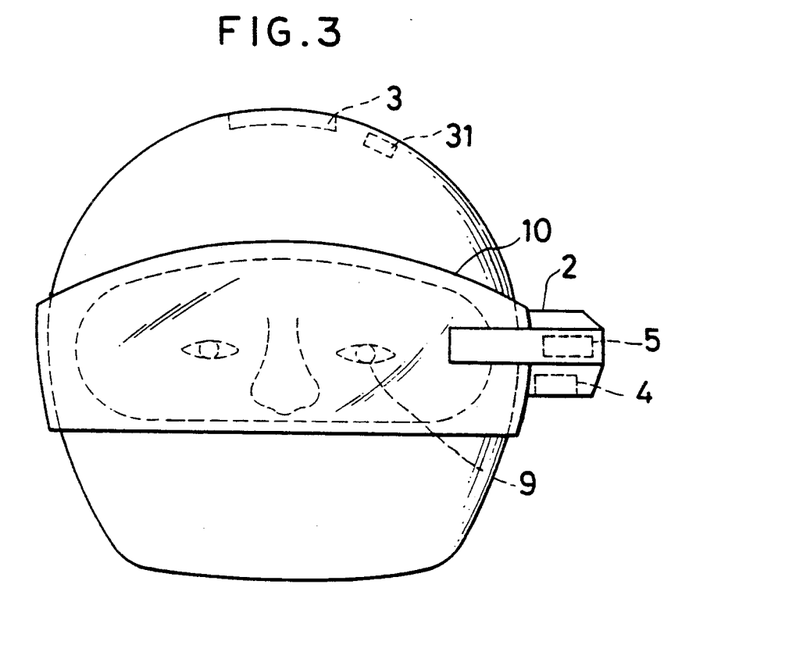
FIG. 3 is a front elevational view of a helmet.
Figure 4:
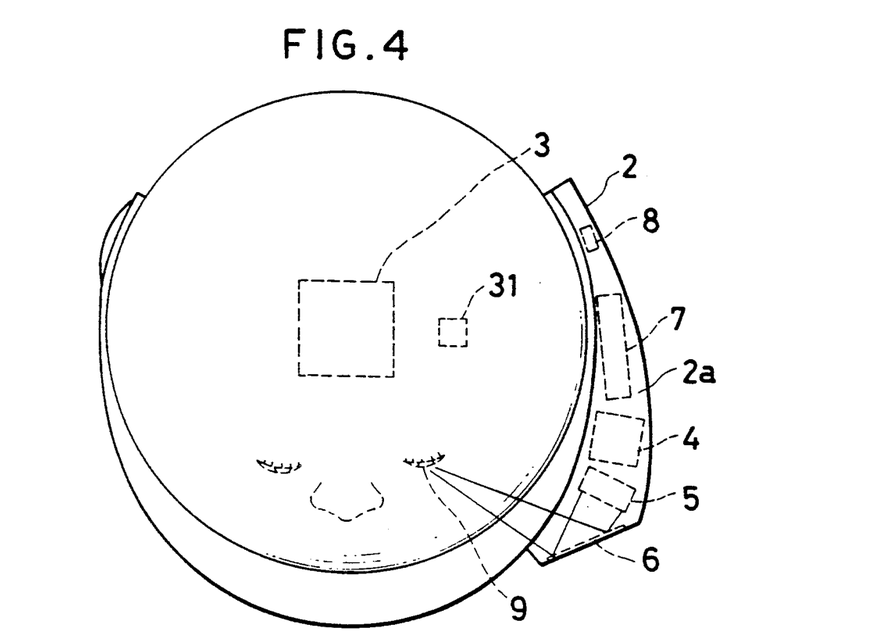
FIG. 4 is a plan view of the helmet.

The receiver and display apparatus 2 receives an infrared signal from the transmitter 1 and samples a speed signal included in the infrared signal to display the speed of the motorcycle corresponding to said speed signal in numerals, in the visual field of the driver M. As shown in FIGS. 3 and 4, the receiver and display apparatus 2 includes a receiver 4 for receiving a transmitted signal from the transmitter 1, a display 5 for projecting data optically, and a half mirror 6 for reflecting data light projected from the display 5 toward eyes 9 of the driver M. The receiver and display apparatus 2 includes also a chargeable secondary battery 7 and a battery charger 8. All of these components comprising the receiver and display apparatus 2 are contained in a case 2a which is fixed on the front shield 10 of the helmet C.

The receiver 4 samples a digital signal representing the travel speed from the received infrared signal, and actuates the display 5, such as a three figure, seven segment type light emitting diode (LED) display, in response to the received signal. The light from the display 5 is in the form of an indication of figures corresponding to the speed signal included in the received signal, and reflected by a half mirror 6 through the front shield 10 of the helmet C toward the eyes 9 of the driver M. Therefore, the driver M can view the light of the figures representing the speed at an end portion of his forward visual field.

A solar cell 3 is embodied in the upper portion of the helmet C, and it's surface may be covered with such transparent resin material that does not materially reduce the transmission of solar energy, although it prevents damage of the solar cell due to external factors. The solar cell 3 transduces the light energy into electric energy, and charges the secondary battery 7 through the battery charger 8 consisting of devices such as diodes.

The secondary battery 7 is a rechargeable battery such as a nickel-cadmium battery. The battery charger 8 functions to provide an electrical current flow from the solar cell to the secondary battery 7, but prevents a reverse flow to the solar cell 3 from the secondary battery 7. The electric power for the receiver 4 and the display 5 is supplied from this secondary battery 7.

A mechanical switch 31 is mounted on the helmet C, so that it becomes ON when the driver M wears the helmet C or when the driver M lowers the front shield 10 while wearing the helmet. Provision of this switch 31 will make the driver M free from determining whether the power supply is ON or OFF. As the secondary battery 7 normally stores the electric power supplied from the solar cell 3, a lot of time and labor to charge the secondary battery 7 separately is saved. It was found that the solar cell 3, which has a capacity 10–20 times as large as the power needs, can be enough to bear use in the night time and even in the rain.

Structure of the Transmitter 1

Figure 5:
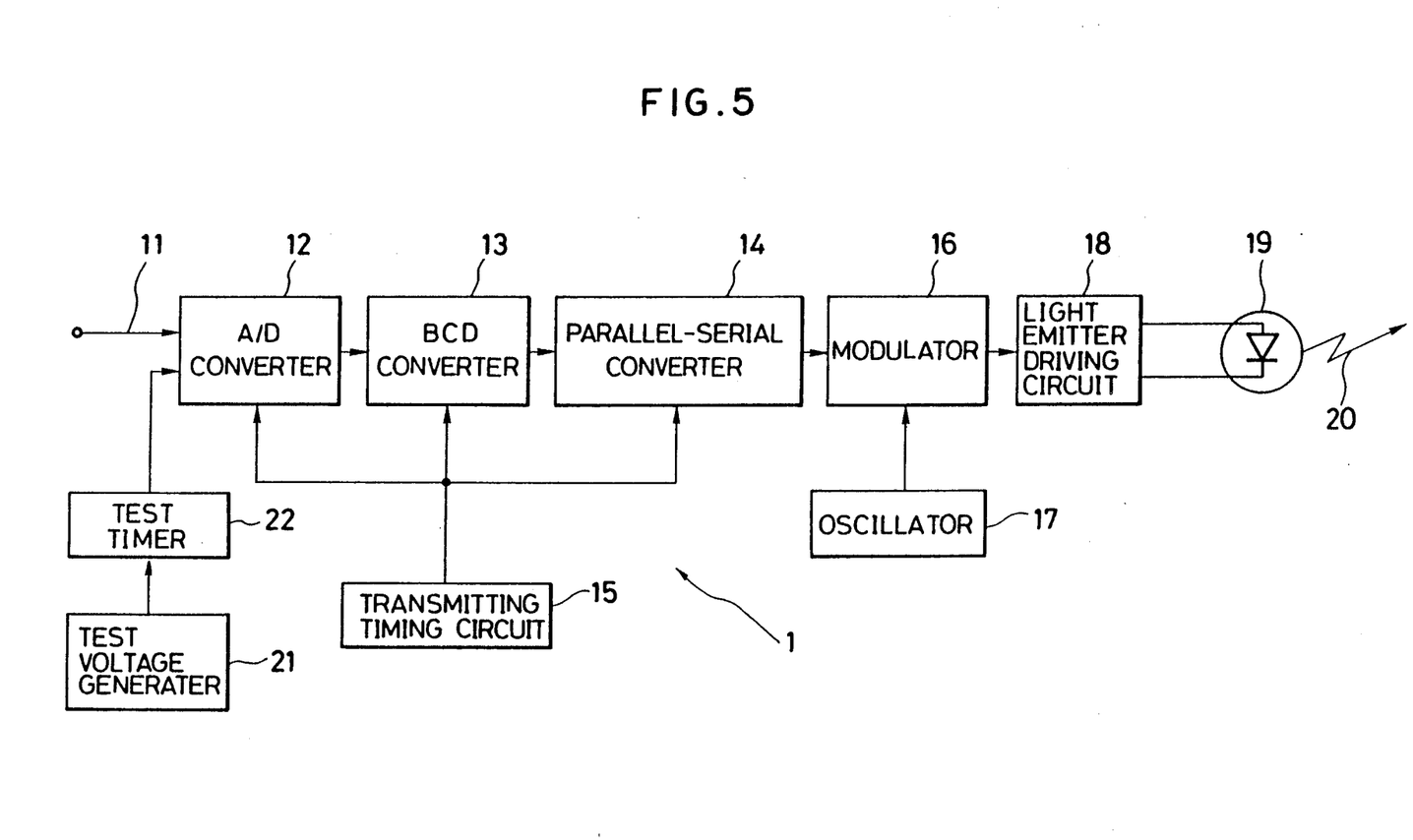
FIG. 5 is a block diagram of a transmitter mounted on the vehicle.

FIG. 5 shows a functional block diagram of the transmitter 1. The transmitter 1 may utilize the power supplies (not shown), such as the batteries, of the motorcycle. In FIG. 5, the transmitter 1 includes a analog to digital (A/D) converter 12 which converts an analog speed signal input 11 into a binary digital signal. The output of the A/D converter 12 is connected to a BCD converter 13 which functions to convert a digital signal from the converter 12 into a binary coded decimal (BCD signal. In these conversions, the binary digital signal and BCD signal may be an 8 bit and a 9 bit digital signal, respectively, so as to indicate speeds ranging from 0 to 199 km/h in increments of 1 km/h.

The output of the BCD converter 13 is connected to a parallel-serial converter 14 which picks p parallel 9 bit signals from the output of the BCD converter to produce a serial signal.

Now, an example in which the travel speed is 15 km/h will be described. In this case, output of the A/D converter 12 is

00001111, and the output of the BCD converter 13 is

000010101.

Figure 7:
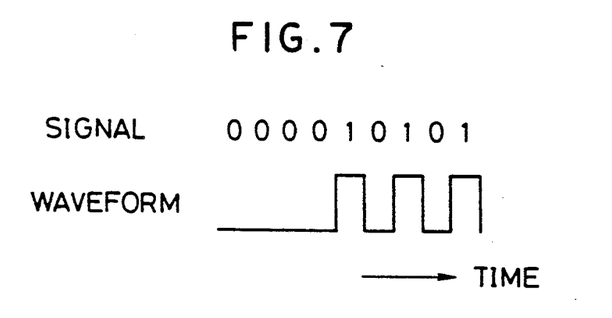
FIGS. 7-9 are charts showing signal patterns.
Figure 8:
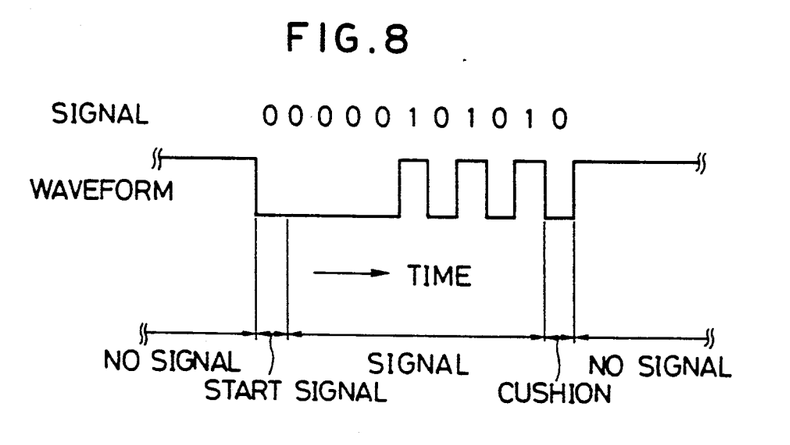

The output of the parallel-serial converter 14 is a wave form as shown in FIG. 7. These three converters 12, 13 and 14 perform respective converting operations at given time intervals (e.g. 0.5 sec) in accordance with timing signals which are produced by a transmitting timing circuit 15. At this time, a conventional start-stop synchronous system may be employed so that a "no" signal condition can be distinguished from a "0" signal when the signal received by the receiver is picked up. That is, in a conventional manner, "0" signals of 1 bit are added before and behind the BCD signal of 9 bits respectively, thereby producing a series of signals of 11 bits, and the "no" signal condition, i.e., the time between BCD signals, is indicated by a constant output of "1". FIG. 8 shows a signal output from the parallel-serial converter 14 in accordance with this system, which signal output is based on the wave form shown in FIG. 7. Therefore, the receiver may read 9 bits following the starting signal, which is the signal produced when an output of "1" is turned to "0". A "0" of the 11th bit following the above signal is provided for a timing cushion.

Figure 9:
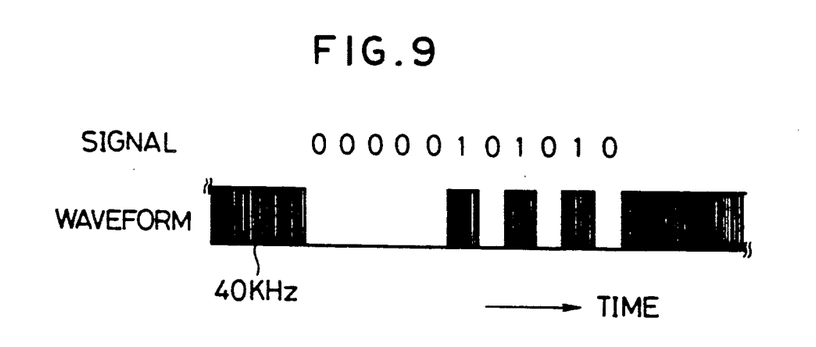

The output signal of the parallel-serial converter 14 is connected to a modulator 16. The modulator 16 is associated with an oscillator 17 and functions to modulate said signal into a harmonic wave such as a 40 KHz frequency intermittent signal, so that the light signal cannot be affected by solar and other external lights. The output of the modulator 16 at the speed of 15 km/h has a wave form shown in FIG. 9. The output of the modulator 16 is connected to a light emitter driving circuit 18 which, in turn, actuate a light emitting device 19, such as a infrared light emitting diode, in response to an input signal to transduce an electrical signal into a light signal 20.

A test voltage generator 21 and test timer 22 are provided to enable testing operation of the transmitter 1 in a manner to be described.

Structure and Operation of the Receiver 4

Figure 6:
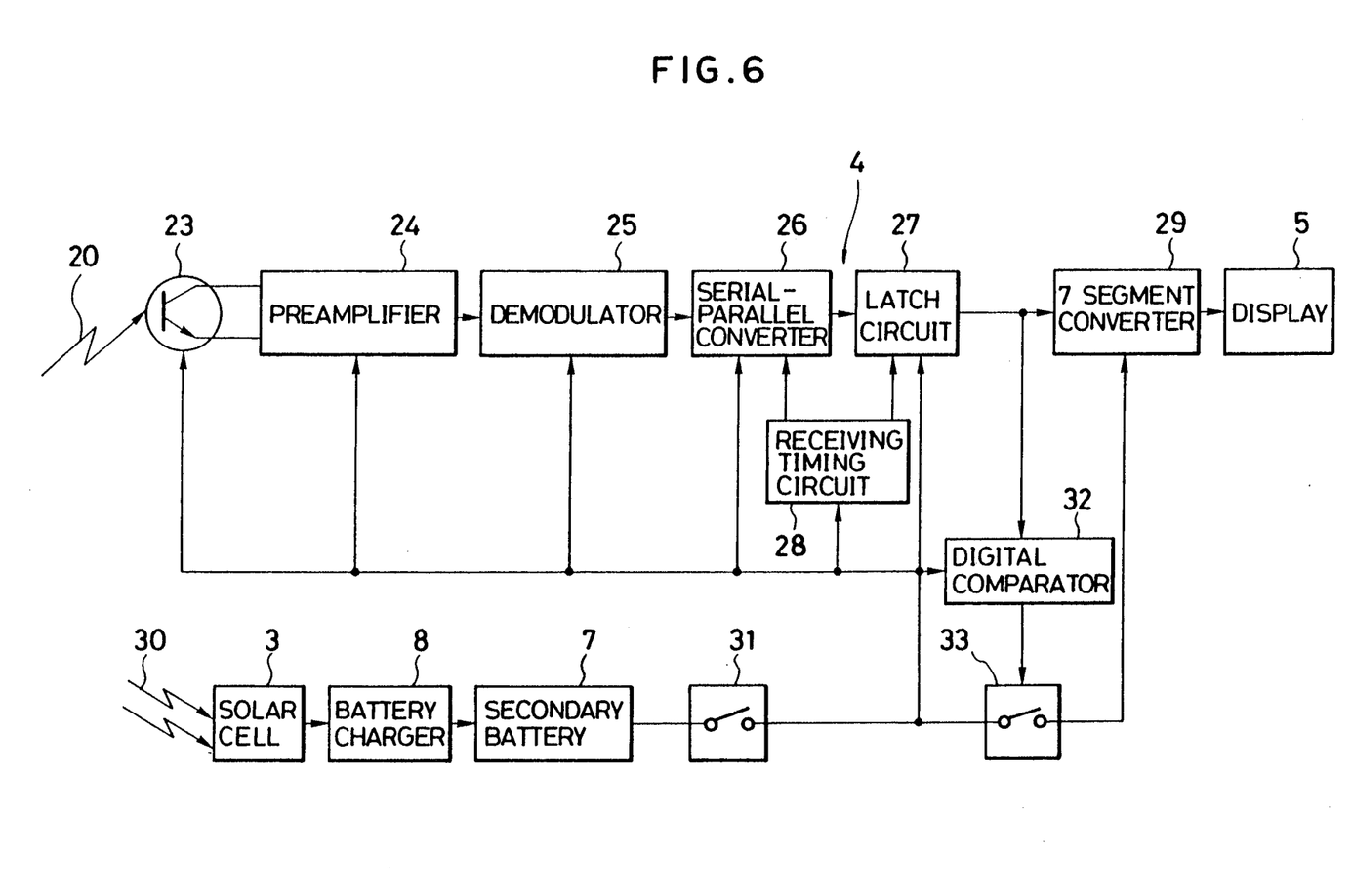
FIG. 6 is a block diagram of a receiver mounted on the helmet.

Referring to FIG. 6, the receiver 4 includes a light detector 23 which, for example, comprises an infrared phototransistor to receive a light signal emitted from the light generator 19 of the transmitter 1 and convert the light signal received into an electrical signal. The output of the light detector 23 is connected to a preamplifier 24 which amplifies the electrical signal from said light detector 23, and inputs it into a demodulator 25. The demodulator 25 forms a signal which is the same as that in FIG. 8 in accordance with the input signal. The electrical signal demodulated by the demodulator 25 is connected to a serial-parallel converter 26 which converts a serial digital signal back to a parallel signal to form a BCD signal representing the travel speed. This BCD signal is, in the case of 15 km/h,

000010101.

This signal is connected to a latch circuit 27. A receiving timing circuit 28 produces the same timing signal as that of the transmitting timing circuit 15 and sends it to the serial-parallel converter 26 and the latch circuit 27 which requires the timing signal.

Figure 10:
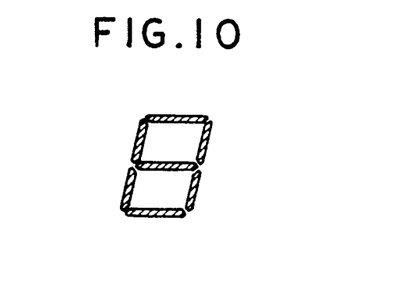
FIG. 10 shows an example of a display figure.

The latch circuit 27 functions to update the BCD signal being sent at a given time, interval such as 0.5 sec, and hold it until a next signal is input. The output of the latch circuit 27 is given to a 7 segment converter 29 which generates an electrical display signal for actuating the display 5. The display light signal generated by the display 5 is, as described hereinbefore, projected in the visual field of the driver M. FIG. 10 shows an example of the indication.

Helmet Power Supply Interrupting System

As shown in FIGS. 1-4, a mechanical switch 31 is mounted on the helmet C. In the embodiment, the mechanical switch 31 is disposed between the secondary battery 7 and the components of the receiver 4, and turned on and off according to the putting on and off, respectively, of the helmet C. That is, the switch 31 will be closed, or turned ON when the driver M puts the helmet C on, and opened, or turned OFF when the driver takes the helmet C off. Furthermore, a digital comparator 32 connected to the output of the latch circuit 27 is provided for controlling an analog switch 33 which actuates the 7 segment converter 29.

Upon receiving a preset speed signal, e.g. a speed signal of 9 km/h or less, the digital comparator 32 causes the analog switch 33 to be opened or turned off, thereby stopping the speed indication. In this way, as the speed indication is not effected at low speed, the power needs of the system will be reduced.

Test Circuit

Referring again to FIG. 5, in a case that the means for stopping the speed indication during low speeds is provided as described above, the speed indication will not be effected even if the driver M puts the helmet C on at starting. Accordingly, it is desirable to provide a means for confirming, when parking, that the system will normally function. For this purpose, a test voltage generator 21 and a test timer 22 are provided. The test timer 22 will be in a conductive condition, i.e., will conduct voltage from test voltage generator 21, for a predetermined time period such as 5 sec after the engine of the motorcycle is started, and will be interrupted after that period. The test voltage generator 21 generates a test voltage corresponding to a predetermined travel speed such as 60 km/h. Thus, the predetermined speed indication will appear in the field of view of the driver during the predetermined time period since the engine start.

Display of Data except the Travel Speed

The present invention may be utilized to display data other than the travel speed of the vehicle. A remaining amount of fuel and an engine speed are typical data to be displayed relating vehicle operation. Other data, which is not related to the operation of the vehicle, for example, the time, may also be displayed.

In case of the remaining amount of fuel, a fuel meter of the vehicle may be of a known type that generates an analog voltage corresponding to the remaining amount of fuel, and this voltage may be processed as in the case of the speed signal. Similarly, the indication of engine speed can be accomplished.

In order to display the time, a light emitting display type digital clock may be disposed at the position of the display 5 of the receiver and display apparatus 2. In this case, it is desirable that the clock be provided with a separate small battery.

Figure 11:
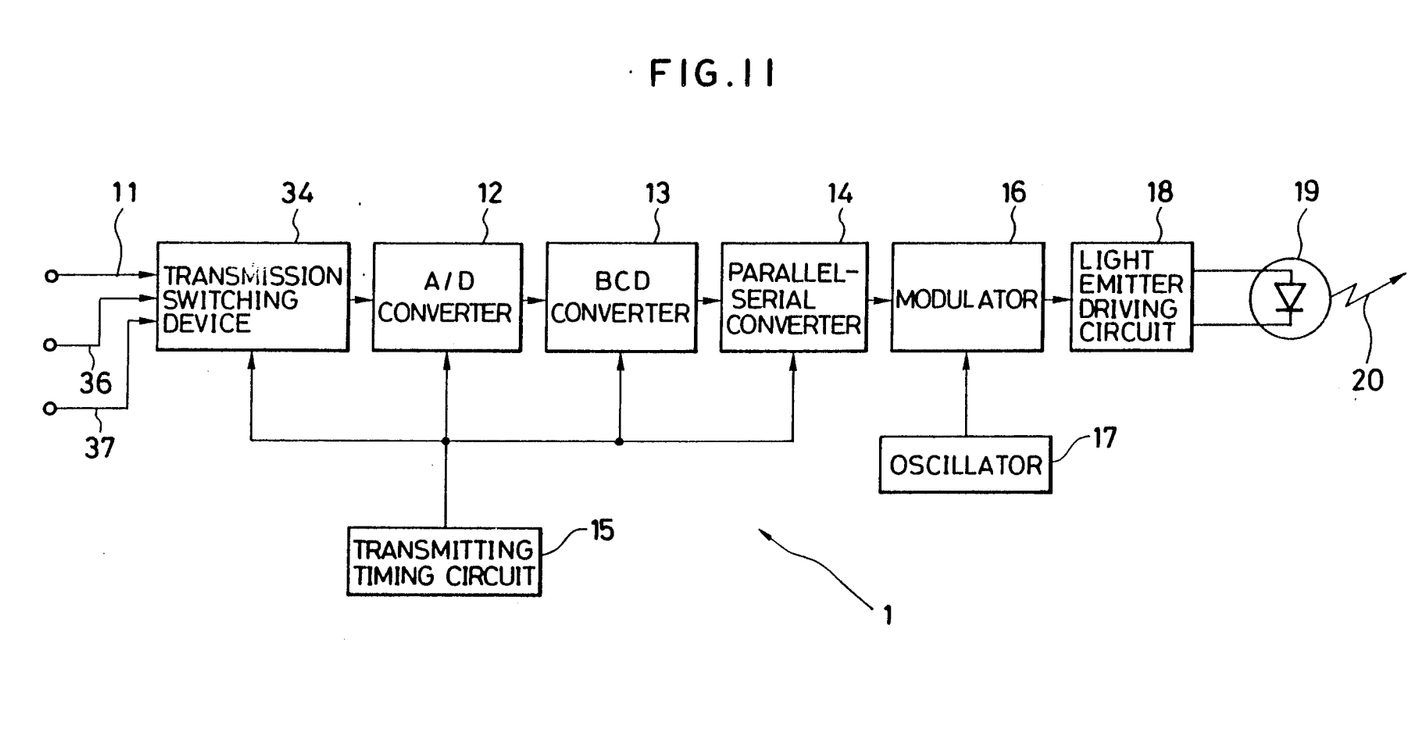
FIG. 11 is a block diagram of a portion of the transmitter showing another example of the present invention.
Figure 13:
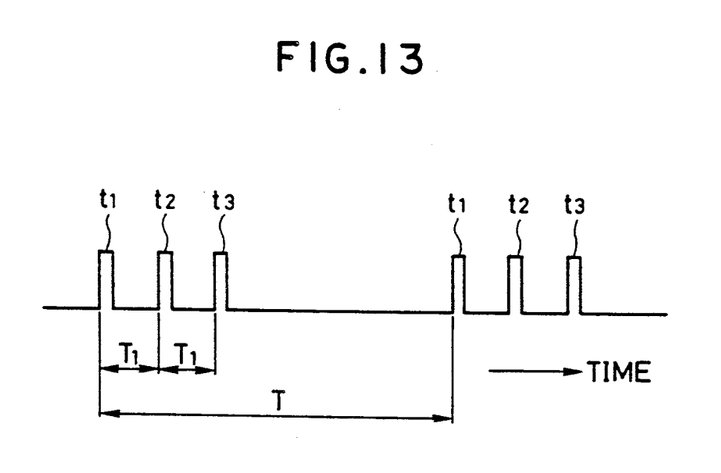
FIG. 13 is a chart showing timing of the signals in the embodiment of FIGS. 11 and 12.

FIG. 11 shows a block diagram of another example of a transmitter for displaying plural data simultaneously. A transmission switching device 34 is inserted at the input of the analog-digital converter 12 of the transmitter 1. An analog speed signal voltage 11, remaining fuel signal voltage 36 and an engine speed signal voltage 37 are input to the switching device 34. The switching device 34 functions to switch these signal voltages 11, 36 and 37 sequentially in response to the timing of the transmitting timing circuit 15 and sends them to the analog-digital converter 12. FIG. 13 shows timing signals of these three signal voltages, wherein $t_1$ is a timing signal of the speed signal, and $t_2$, $t_3$ are timing signals of the remaining fuel signal and the engine speed signal, respectively. Each of these timing signals $t_1$, $t_2$ and $t_3$ is picked up at an interval $T_1$, e.g. 0.1 sec. A time interval between a preceding speed signal $t_1$ and a following speed signal $t_1$ is T, e.g. 0.5 sec.

Figure 12:
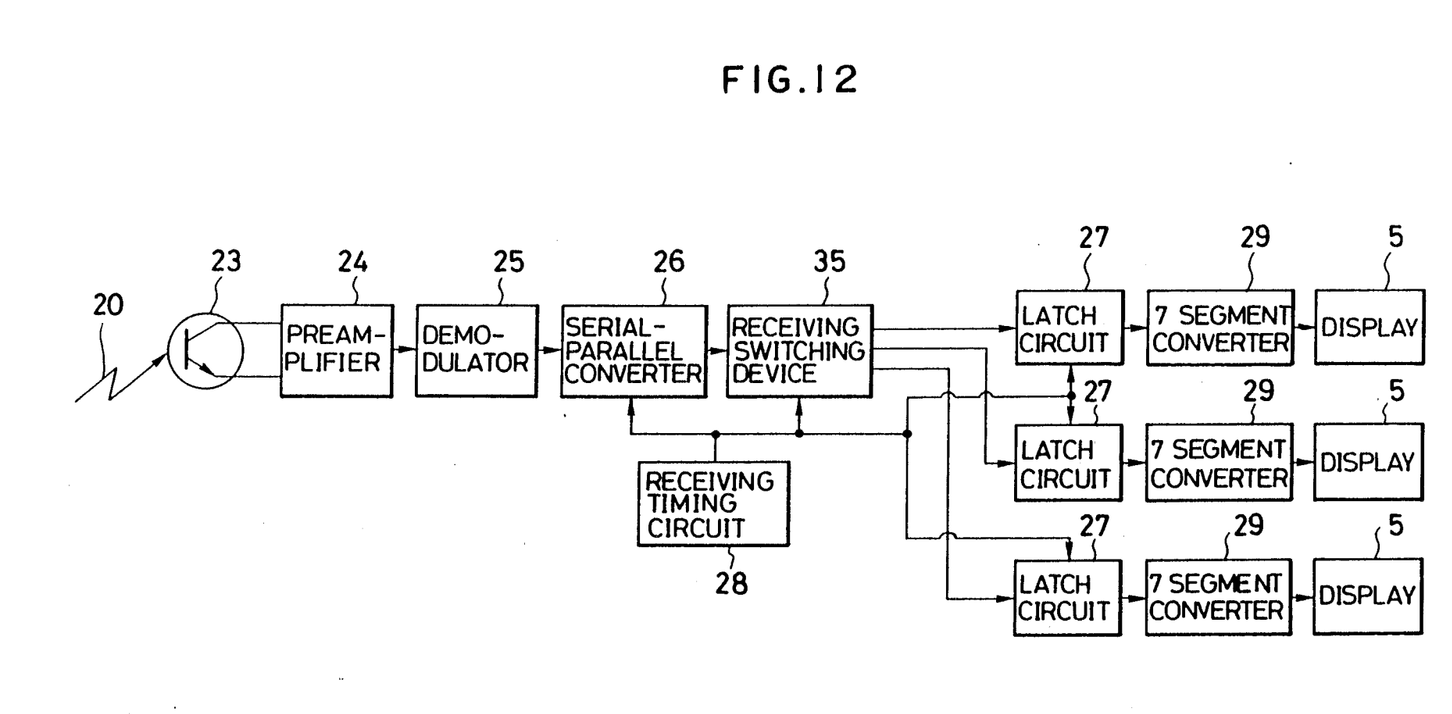
FIG. 12 is a block diagram of the receiver in the embodiment of FIG. 11.

FIG. 12 shows a block diagram of the receiver 4 for displaying plural data simultaneously. Since three different BCD signals sequentially appear at the output of the serial-parallel converter 26 of the receiver 4, which is composed as in FIG. 6, the receiving switching device 35 switches these BCD signals to pick up and send them to a respective latch circuit 27 of three systems sequentially. If the amount of fuel is indicated by 1 scale unit, with a full tank state being 100 and an empty state being 0, and the engine speed indicated by 100 rpm scale units with 10000 rpm being 100 on the scale, the bit number of both conversions can be the same bit number as in the case of speed indication.

Transmission and Reception by Supersonic Waves

While the display system which utilizes infrared rays as a medium of the transmission and the reception has been illustrated and described hereinbefore, it is possible to use another medium such as supersonic waves instead of infrared rays. In application of supersonic waves, for example, a piezoelectric transducer made of barium titanic acid or titanic acid lead zirconate may be used, instead of the light emitting device 19 of FIG. 5, to transmit modulated supersonic waves in the same way as in the previous embodiment. Additionally, such a piezoelectric transducer may be used, instead of the light detector 23 of FIG. 6, to transduce the received supersonic waves into an electrical signal.

Transmission and Reception by Radio Waves

Also, it is possible to use a radio waves as well as infrared rays and supersonic waves, as a medium of the transmission and reception of signals. In case of the radio wave application, for example, the system of the present invention may be composed as described below. First, in the transmitter 1 (FIG. 5), a subcarrier is produced as the output of the modulator 16. Then, instead of the light emitter driving circuit 18 and the light emitting device 19 (FIG. 5), a main carrier of 100 times higher frequency than that of the subcarrier is produced and frequency modulated by said subcarrier. The frequency modulated main carrier is fed to a transmitting antenna for transmitting the radio waves in air. On the other hand, in order to receive radio waves, a receiving antenna may be used to receive the transmitted radio waves, in place of the light detector 23 and preamplifier 24 of FIG. 6. The received radio wave signal is then amplified by a main-carrier amplifier and demodulated by a main-carrier demodulator to pick up a sub-carrier which is, in turn, input to the demodulator 25 of FIG. 6.

Application of a Solar Cell

The solar cell 3 installed on the helmet C generates the electric energy for storing it in the secondary battery, and permits the system of the present invention to be used in the night time and the rain.

Generally, the solar energy in fine, or clear weather is known to be 1 KW/m$^2$. The energy conversion efficiency of the solar cells commercially available is on the order of 10%. However, the energy conversion coefficients of highly efficient solar cells have reached 20% to 22%. On the other hand, power needs of equipment on the helmet C are calculated to be on the order of 0.02 W. Therefore, it is possible to provide a display system which can bear use in the night time and the rain by employing a solar cell 3 having a 10 to 20 times larger capacity than the above power needs. For example, if the capacity of the solar cell is 0.3 W and the energy conversion efficient is 20%, the size of the solar cell will be about 15 cm$^2$. Thus, a solar cell 3 of this size can be incorporated into an upper portion of the helmet C.

In recapitulation, in the present invention, the wireless transmitter 1 for transmitting data related to the operation of the vehicle is installed on the vehicle, while the wireless receiver and display apparatus 2 for receiving the transmitted signal from said transmitter and displaying the light indication in the visual field of the driver is installed on the helmet of the driver. Therefore, the cord, which conventionally connects the helmet to the vehicle and is troublesome for use, can be eliminated. Additionally, the mechanical switch which is turned on and off when the driver puts the helmet on and off respectively is mounted on the helmet, so that the power supply can automatically be interrupted. Because a combination of the solar cell and the chargeable secondary battery is employed as the power supply for the helmet, the system of the present invention can be used in the night time and the rain.

What is claimed is:

1. A data display system for a vehicle intended to be driven on a roadway including:
    generating means for generating a signal containing data representative of an operating condition of said vehicle;
    wireless transmitter means mounted on a vehicle adjacent to a driver's seat provided in said vehicle, for transmitting said signal generated by said generating means;
    said transmitter means transmitting said signal in a range of a cone diverging from said transmitter means in a direction and at an angle to cover a helmet worn by a driver of the vehicle while sitting in a normal driving position in the driver's seat of the vehicle;
    wireless receiver means mounted on the helmet worn by the driver of said vehicle, for receiving the transmitted signal from said transmitter means and generating an output signal;
    a power supply mounted on said helmet for supplying electric power to said receiver means; and
    converting and displaying means connected to said receiver means, for converting the output signal of said receiver means into a light display signal of visible rays to display the data representative of the operating condition of the vehicle in the form of indicia which indicia changes in accordance with the value of the operating condition and for displaying the indicia of the display signal in a forward visual field of the driver while the driver is operating the vehicle.

2. The system of claim 1 in which said wireless transmitter means comprises an infrared transmitter for transmitting an infrared signal and said wireless receiver means comprises an infrared receiver for receiving the infrared signal.

3. The system of claim 1 in which said wireless transmitter means comprises a supersonic wave transmitter for transmitting a supersonic wave signal and said wireless receiver means comprises a supersonic wave receiver for receiving the supersonic wave signal.

4. A helmet used by a driver of a vehicle intended to be driven on a roadway including:
    wireless receiver means for receiving a wirelessly transmitted signal and generating an output, the wirelessly transmitted signal being generated by a generating means mounted on the vehicle and being representative of an operating condition of the vehicle, a transmitter means mounted on the vehicle receiving the signal from the generating means and transmitting the signal in a range of a cone diverging from the transmitter means in a direction and at an angle to cover the helmet when worn by the driver of the vehicle while sitting in a normal driving position in the driver's seat of the vehicle;

converting and displaying means for generating a light display signal of visual light from the output of said receiver means to display data representative of the operating condition of the vehicle in the form of indicia which indicia changes in accordance with the value of the operating condition and for displaying the indicia of the display signal in forward visual field of the driver while the driver is operating the vehicle; and a power supply mounted on the helmet for supplying electric power to said receiver means.

5. The helmet of claim 4, wherein said power supply comprises a solar cell and a chargeable secondary battery.

6. The data display system of claim 1, in which said transmitter means also includes a test signal generating means to indicate a test result when starting said vehicle.

7. The data display system of claim 1, in which said wireless receiver means includes means for generating a signal representing the time to indicate the time.

8. The data display system of claim 2, in which said wireless transmitter means also includes a test signal generating means to indicate a test result when starting said vehicle.

9. The data display system of claim 3, in which said wireless transmitter means also includes a test signal generating means to indicate a test result when starting said vehicle.

10. The data display system of claim 2, in which said wireless receiver means includes means for generating a signal representing the time to indicate the time.

11. The data display system of claim 3, in which said wireless receiver means includes means for generating a signal representing the time to indicate the time.

12. The data display system of claim 6, in which said wireless receiver means includes means for generating a signal representing the time to indicate the time.

13. In combination, a vehicle intended to be driven on a roadway and a wireless transmitter means, said transmitter means is mounted on said vehicle so that a data signal diverges in a range of a cone from said transmitter means in a direction and at an angle covering a helmet worn by a driver of said vehicle sitting in a normal driving position on said vehicle, and comprises means for generating said conically shaped data signal representing data related to an operating condition of said vehicle and means for transmitting said conically shaped data signal, the combination further comprising:

wireless receiver means within said helmet for receiving said conically shaped data signal transmitted by said transmitter means and generating an output signal;

a power supply mounted on said helmet; and converting and displaying means for converting the output signal of said receiver means into a light display signal of visible rays to display the data representative of the operating condition of the vehicle in the form of indicia which indicia changes in accordance with the value of the operating condition and for displaying in a forward visual field of the driver.

14. The combination as claimed in claim 13, wherein said wireless transmitter means comprises an infrared transmitter for transmitting an infrared signal and said wireless receiver means comprises an infrared receiver means for receiving the infrared signal.

15. The combination as claimed in claim 13 in which said wireless transmitter means comprises a supersonic wave transmitter for transmitting a supersonic wave signal and said wireless receiver means comprises a supersonic wave receiver for receiving the supersonic wave signal.

16. The combination as claimed in claim 13, wherein said power supply comprises a solar cell and a chargeable secondary battery.

17. The combination as claimed in claim 13, in which said wireless transmitter means also includes a test signal generating means to indicate a test result when starting said vehicle.

18. The helmet as claimed in claim 4, wherein said wireless receiver means comprises an infrared receiver for receiving an infrared signal from said transmitter means.

19. The helmet as claimed in claim 4 in which said wireless receiver means comprises a supersonic wave receiver for receiving a supersonic wave from said transmitter means.

* * * * *